United States Patent
Engstrom et al.

(10) Patent No.: US 11,834,070 B2
(45) Date of Patent: Dec. 5, 2023

(54) PROBABILISTIC SIMULATION SAMPLING FROM AGENT DATA

(71) Applicant: Waymo LLC, Mountain View, CA (US)

(72) Inventors: Johan Engstrom, Los Gatos, CA (US); Emmanuel Christophe, Mountain View, CA (US); Joseph Lee, Menlo Park, CA (US); Isaac Supeene, South San Francisco, CA (US); Razvan Mathias, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 183 days.

(21) Appl. No.: 17/370,924

(22) Filed: Jul. 8, 2021

(65) Prior Publication Data
US 2023/0011497 A1    Jan. 12, 2023

(51) Int. Cl.
*B60W 60/00* (2020.01)
*B60W 30/095* (2012.01)
*G06V 40/20* (2022.01)

(52) U.S. Cl.
CPC .... *B60W 60/0011* (2020.02); *B60W 30/0956* (2013.01); *G06V 40/20* (2022.01); (Continued)

(58) Field of Classification Search
None
See application file for complete search history.

(56) References Cited

U.S. PATENT DOCUMENTS

| | | | |
|---|---|---|---|
| 11,577,741 B1 * | 2/2023 | Reschka | B60W 50/045 |
| 11,603,095 B2 * | 3/2023 | Schleede | G08G 1/166 |

(Continued)

OTHER PUBLICATIONS

Basak et al. Modeling Reaction Time within a Traffic Simulation Model, Proceedings of the 16th International IEEE Annual Conference on Intelligent Transportation Systems (ITSC 2013), The Hague, The Netherlands, Oct. 6-9, 2013 (Year: 2013).*

(Continued)

*Primary Examiner* — Ryan Rink
(74) *Attorney, Agent, or Firm* — Fish & Richardson P.C.

(57) ABSTRACT

Methods, systems, and apparatus, including computer programs encoded on a computer storage medium, for determining the likelihood that a particular event would occur during a navigation interaction using simulations generated by sampling from agent data. In one aspect, a method comprises: identifying an instance of a navigation interaction that includes an autonomous vehicle and agents navigating in an environment; generating multiple simulated interactions corresponding to the instance, comprising, for each simulated interaction: identifying one or more agents; for each identified agent and for each property that characterizes behavior of the identified agent, obtaining a probability distribution for the property; sampling a respective value from each of the probability distributions; and simulating the navigation interaction in accordance with the sampled values; and determining a likelihood that the particular event would occur during the navigation interaction based on whether the particular event occurred during each of the simulated interactions.

20 Claims, 4 Drawing Sheets

(52) U.S. Cl.
CPC .............. *B60W 2554/4046* (2020.02); *B60W 2554/4049* (2020.02)

(56) References Cited

U.S. PATENT DOCUMENTS

| | | | |
|---|---|---|---|
| 2010/0191391 A1* | 7/2010 | Zeng ....................... | G01S 13/87 |
| | | | 701/1 |
| 2019/0213103 A1* | 7/2019 | Morley ............... | G06F 11/3692 |
| 2019/0283746 A1* | 9/2019 | Shalev-Shwartz ... | G05D 1/0221 |
| 2020/0353943 A1* | 11/2020 | Siddiqui ................ | G06N 3/045 |
| 2021/0370972 A1* | 12/2021 | Bagschik ............ | B60W 50/045 |
| 2022/0204029 A1* | 6/2022 | Chen ....................... | G06T 7/74 |
| 2022/0215142 A1* | 7/2022 | Gutierrez ............... | G06N 20/00 |
| 2022/0227367 A1* | 7/2022 | Kario ................ | B60W 30/0956 |
| 2022/0269836 A1* | 8/2022 | Mukundan .......... | B60W 60/001 |

OTHER PUBLICATIONS

Bärgman et al., "How does glance behavior influence crash and injury risk? A 'what-if' counterfactual simulation using crashes and near-crashes from SHRP2," Transportation Research Part F: Traffic Psychology and Behavior, Nov. 2015, 35:152-169.
McLaughlin et al., "A method for evaluating collision avoidance systems using naturalistic driving data," Accident Analysis and Prevention, Jan. 2008, 40(1):8-16.

\* cited by examiner

PROBABILISTIC SIMULATION SAMPLING FROM AGENT DATA

BACKGROUND

This specification relates to simulating navigation of an autonomous vehicle in an environment populated by agents.

The environment can be a real-world environment, and the agents can be, e.g., vehicles or pedestrians in the environment.

Autonomous vehicles include self-driving cars, boats, aircraft, and spacecraft. Autonomous vehicles use a variety of on-board sensors and computer systems to detect nearby objects and use such detections to make control and navigation decisions.

A computer simulation of a real-world environment is a set of one or more software programs that simulates the dynamics of the real-world environment and allows navigation interactions between agents that are simulated versions of agents in the real-world environment to be modeled. For example, some computer simulations receive as input logged data from navigation interaction in a real-world environment and then simulate the navigation interaction in a virtual environment that is a simulation of the real-world environment. As another example, some computer simulations can generate synthetic data representing a synthetic scene in the virtual environment and can simulate navigation interactions in the synthetic scene.

Behavior prediction systems generate behavior predictions for agents in an environment, e.g., a real-world environment or a simulated environment generated by computer simulations, from the perspective of a target agent in an environment. For example, a behavior prediction system can receive an observation that includes data about a scene in an environment and about the agents in the scene as observed by the target agent and can generate a prediction about the future behavior, e.g., generate a future trajectory or assign likelihoods to multiple possible future trajectories, for another agent in the environment.

SUMMARY

This specification describes a system implemented as computer programs on one or more computers in one or more locations for determining the likelihood that a particular event would occur during a navigation interaction using one or more simulations of the navigation interaction, each simulation generated by sampling from agent data.

According to a first aspect there is provided a method performed by one or more computers, the method comprising: identifying an instance of a navigation interaction that includes an autonomous vehicle and one or more agents navigating in an environment; generating a plurality of simulated interactions corresponding to the instance, comprising, for each simulated interaction: identifying one or more of the agents; for each identified agent and for each of one or more properties that characterize behavior of the identified agent, obtaining data representing a probability distribution over a set of possible values for the property; sampling a respective value from each of the probability distributions; and simulating the navigation interaction using a computer simulation of the environment such that, for each identified agent and for each of the one or more properties, the identified agent behaves in the computer simulation with the value sampled from the probability distribution for the property; determining, for each simulated interaction, whether a particular event occurred during the simulated interactions; and determining a likelihood that the particular event would occur during the navigation interaction based at least in part on whether the particular event occurred during each of the simulated interactions.

In some implementations, simulating the navigation interaction comprises simulating the navigation interaction such that any other agent that is not identified behaves as the other agent did in the instance of the navigation interaction.

In some implementations, for each identified agent, the one or more properties include a property that defines a reaction time of the identified agent to a stimulus.

In some implementations, during the simulation, for each identified agent, a respective action is selected to be performed by the agent at each of a plurality of time steps in response to (i) state data characterizing a respective state of the environment at the time step and (ii) behavior predictions for other agents in the simulation.

In some implementations, simulating comprises: selecting, based on the sampled value for the property, a time window after the time step at which the stimulus occurred; setting the behavior predictions for the time steps in the time window to the behavior predictions obtained at a most recent time step prior to the time step at which the stimulus occurred; and obtaining new behavior predictions starting from the first time step after the time window has elapsed.

In some implementations, for each identified agent and for each of one or more properties that characterize behavior of the identified agent, obtaining data representing a probability distribution over a set of possible values for the property comprises: the probability distribution being generated from logged data characterizing agents navigating in the environment.

In some implementations, for each identified agent and for each of the one or more properties, the probability distribution over the set of possible values for the property represents an estimate of a range of possible responses of agents controlled by humans to a stimulus.

In some implementations, the particular event is a collision between two agents in the environment.

In some implementations, the particular event is one of a low severity collision or a high severity collision.

In some implementations, for each identified agent, the one or more properties include a property that defines a reaction time of the identified agent to a stimulus, further comprising: identifying, in the instance, a time point at which the stimulus occurs by identifying an interaction between two agents that satisfies one or more criteria.

Particular embodiments of the subject matter described in this specification can be implemented so as to realize one or more of the following advantages.

The system described in this specification can determine the likelihood that a particular event would occur during a navigation interaction based at least in part on whether the particular event occurred during each of multiple simulations of the navigation interaction generated by sampling from agent data. The system can generate each variation of a navigation interaction by identifying one or more agents in the navigation interaction and, for each identified agent, sampling one or more values from respective probability distributions corresponding to one or more properties which influence behavior of the identified agent. Each respective probability distribution can be generated from agent data corresponding to the respective property. Determining the likelihood of a particular event occurring during a navigation interaction can be used to evaluate the safety of deploying an agent into its role, which can be important for safety-critical deployments such as deploying an autonomous vehicle on public roadways. In particular, simulating the navigation interactions by sampling from probability distributions based on agent data can enable the simulations to be more realistic, thereby increasing the usefulness of the simulations and the certainty of the determined likelihood.

Determining the likelihood of an event occurring during a navigation interaction based at least in part on simulations of the navigation interaction can enable the determination of the likelihood of a rare but important event occurring, e.g., a collision. Conventionally, the determination of the likelihood of a rare event occurring can require large quantities of navigation interactions and data, which can require a prohibitively large amount of time to collect from only real-world deployments. Variations of navigation interactions can be generated much more quickly using simulations than purely from real-world deployments, thereby enabling the determination of likelihoods of rare events.

Determining the likelihood based at least in part on simulations of the navigation interaction as opposed to purely on navigation interactions in real-world deployment can enable the determination of the true risk that an adverse event would occur in a real-world navigation interaction even if the adverse interaction did not actually occur in the real-world.

Adverse events, e.g., collisions, can cause damage to agents in the environment. Using simulations to identify the risk of these adverse events occurring in similar situations as have been encountered in the real world can enable the identification and deployment of potential improvements to the agent before additional real-world testing, reducing the risk that adverse events occur during future real-world navigation interactions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
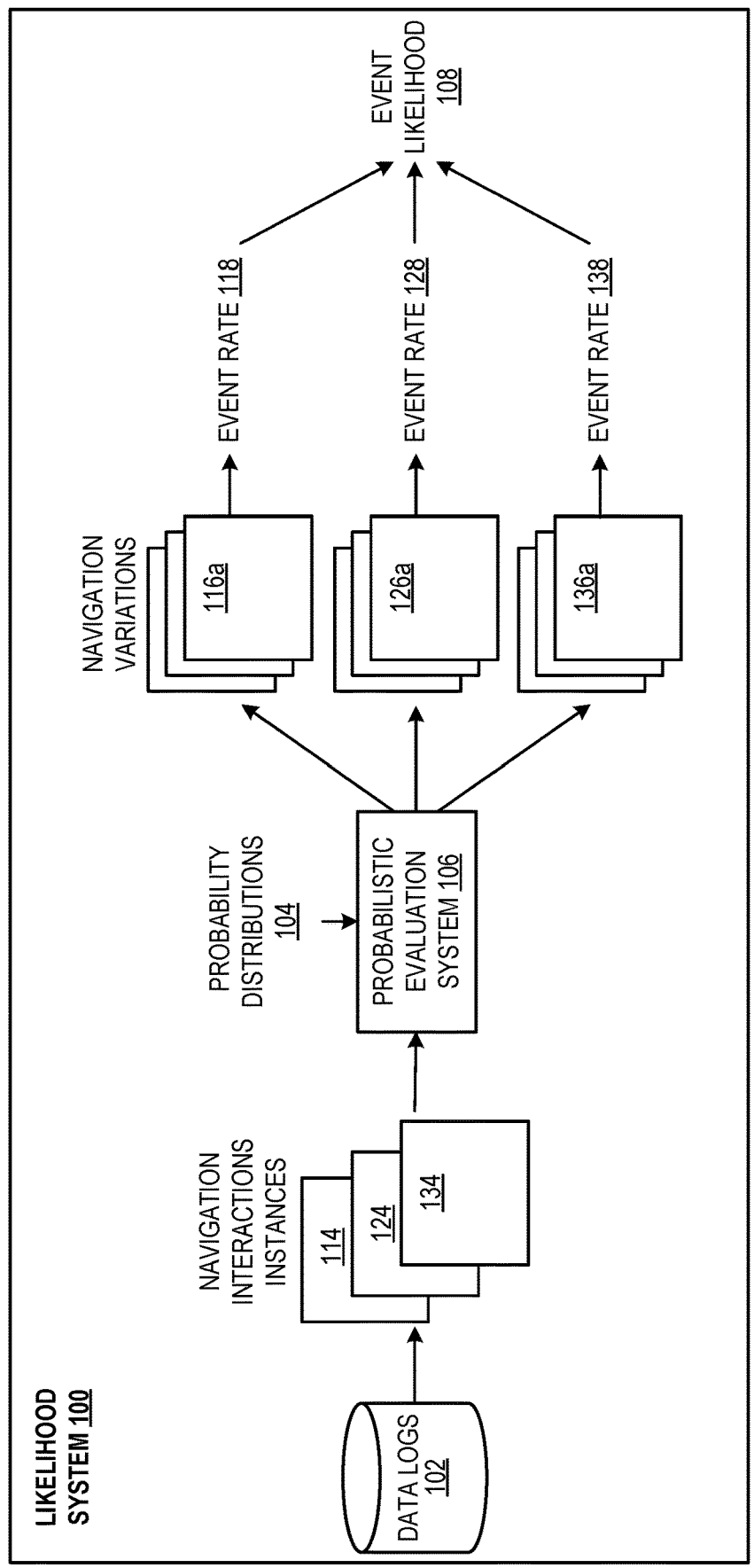
FIG. 1 is a block diagram of an example likelihood system.

FIG. 1 is a block diagram of an example likelihood system 100. The likelihood system 100 is an example of a system implemented as computer programs on one or more computers in one or more locations in which the systems, components, and techniques described below are implemented.

The likelihood system 100 determines the likelihood of a particular event occurring during a navigation interaction using multiple variations of a navigation interaction that are simulated based on agent data. For example, the likelihood system 100 can identify one or more instances of a navigation interaction from a set of data logs 102. Data logs 102 can store instances of various navigation interactions recorded from real-world agent deployments, e.g., lidar point clouds, radar data, or camera images (e.g., intensity values or RGB values for each pixel in an image) recorded from real-world driving. Alternatively, the data logs 102 can store purely synthetic data corresponding to artificial objects in a virtual environment.

Once the system 100 has identified one or more instances, the system can generate, for each instance, multiple simulations that each represent a different variation of the instance. The system can then determine the event likelihood 108 of a particular event occurring during the navigation interaction based at least in part on how frequently the particular event occurred during the multiple simulations, as is described in further detail below.

The likelihood system 100 can be configured to identify an instance of any appropriate navigation interaction recorded in the set of data logs 102. For example, the likelihood system 100 can be configured to identify navigation interactions including, e.g., robotic agents performing a task, or (semi- or fully-) autonomous vehicles in traffic interactions (e.g., one agent passing a second agent, one agent hard braking while being followed by a second agent, one agent making an unprotected turn into oncoming traffic, etc.).

The likelihood system 100 can be configured to generate the multiple simulations of a given navigation interaction by varying, among the multiple simulations, any appropriate properties representing behavior of one or more agents in the navigation interaction. For example, for agents representing other vehicles interacting with the autonomous vehicle, the properties can include reaction times, magnitude in braking, magnitude in accelerating, average following distances behind other vehicles, average lead for passing other vehicles, or any combination thereof.

The likelihood system 100 can be configured to determine the likelihood of any event appropriate to the navigation interaction. For example, for agents representing autonomous vehicles, the events can represent collisions, traffic violations, or failing to detect a pedestrian.

The system described herein is widely applicable and is not limited to one specific implementation. However, for illustrative purposes, a small number of example implementations are described below.

In some implementations, the agents can represent autonomous aircraft or drones, and the properties can correspond to average flight speed, average hovering altitude, or average following distance with respect to other agents. The particular event can represent a collision, or airspace violations.

In some implementations, the agents can represent autonomous vehicles, and the properties can include a reaction time to a stimulus. The stimulus can represent an instance of a lead vehicle hard braking while being followed by a second agent, or an instance of looming, where another agent or object is detected in the distance ahead of an identified agent.

In some implementations, the agents can represent autonomous vehicles, and the navigation interaction can include an unprotected turn, or an instance of passing another agent, whether the other agent is driving or stopped.

In some implementations, the agents can represent pedestrians, and the properties can represent aggressiveness, distraction, speed, or position of the pedestrians. The navigation interaction can include the pedestrian jaywalking.

In some implementations, the agents can represent cyclists, and the properties can include aggressiveness, distraction, speed, or position. The navigation interaction can include the cyclists crossing at red lights, or swerving into the autonomous vehicle's lane.

The likelihood system 100 can identify instances of a navigation interaction from the set of data logs 102. For example, the likelihood system 100 can identify navigation interaction instances 114, 124, and 134, if they fulfill specific criteria corresponding to the navigation interaction, e.g., an interaction involving one agent passing another agent, or one agent applying a hard brake while being followed by a second agent.

The likelihood system 100 can generate multiple variations of each identified instance of the navigation interaction by sampling from probability distributions 104 using a probabilistic evaluation system 106.

For example, the probabilistic evaluation system 106 can identify one or more agents in each navigation interaction instance, and for each identified agent and for each of one or more properties that characterize behavior of the identified agent, sample a value for the property from a corresponding probability distribution in the probability distributions 104. For example, the probabilistic evaluation system 106 can sample the values from the corresponding distribution by exhaustively sampling values from the distribution, or by randomly sampling from the distribution. Alternatively, the probabilistic evaluation system 106 can sample the values from the corresponding distribution by targeting a particular region of interest within the distribution (e.g., by oversampling long reaction times from a distribution based on agent reaction times) and adjusting the final likelihood estimate accordingly.

The probabilistic evaluation system 106 can generate, e.g., a set of navigation variations including navigation variation 116a of navigation interaction instance 114, a set of navigation variations including navigation variation 126a of navigation interaction instance 124, and a set of navigation variations including navigation variation 136a of navigation interaction instance 134, as is described in further detail below with reference to the description of FIG. 2.

The likelihood system 100 can generate an event rate for each set of navigation variations. For example, for each set of navigation variations, the likelihood system 100 can determine the number of times a particular event occurred during the respective navigation variations (e.g., for each navigation variation, whether a collision occurred), and determine the rate based on the number of times the particular event occurred (e.g., as a simple ratio of the number of occurrences out of the number of variations). The likelihood system 100 can determine, e.g., event rate 118 characterizing the rate that the particular event occurred during set of navigation variations including navigation variation 116a, event rate 128 characterizing the rate that the particular event occurred during set of navigation variations including navigation variation 126a, and event rate 138 characterizing the rate that the particular event occurred during a set of navigation variations including navigation variation 136a.

The likelihood system 100 can generate an event likelihood 108 which characterizes the likelihood that a particular event would occur during a navigation interaction based at least in part on the event rates. For example, likelihood system 100 can determine the event likelihood 108 (e.g., the likelihood that a collision occurs during a navigation interaction comprising an identified agent hard braking while being followed by a second agent) based at least in part on the event rates 118, 128, and 138, as is discussed in further detail below with reference to the description of FIG. 2.

The system can determine the event likelihood 108 even for events that did not occur during real-world navigation interactions in the set of data logs 102. In particular, the likelihood system 100 can generate multiple variations of each instance of the navigation interaction identified in the set of data logs 102, where each variation represents one possible variation of how the navigation interaction could have progressed had the one or more identified agents behaved according to the sampled values of the one or more properties corresponding to the behavior of the agent. For example, the system can determine the event likelihood 108 of a collision occurring during a tailgating interaction even if no collision was observed during any of the tailgating navigation interactions in the data logs 102. The system can generate multiple variations of the interaction, each variation indicating how the tailgating interaction could have progressed had the one or more identified agents behaved according to sampled values corresponding to, e.g., follow distance, magnitude in braking, reaction time, or any combination thereof.

The one or more properties corresponding to agent behavior can be sampled from probability distributions 104 generated, e.g., based on observed agent behavior in a variety of driving scenarios. Generating the probability distributions based on observed agent behavior in a variety of driving scenarios can enable the sampled values of the one or more properties corresponding to agent behavior in simulations to reflect real-world agent behavior.

Figure 2:
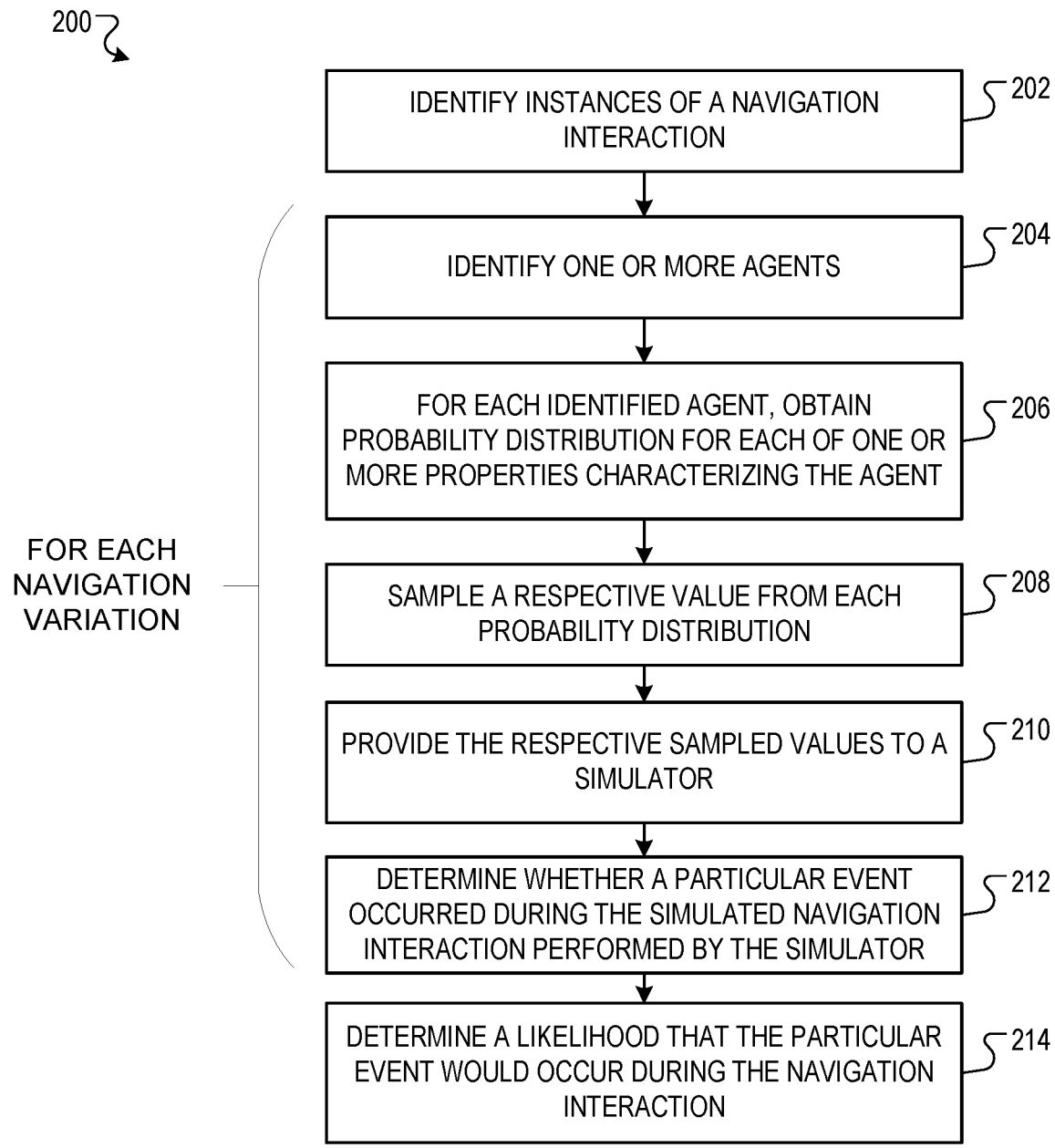
FIG. 2 is a flow diagram of an example process for determining the likelihood of a particular event occurring during a navigation interaction.

FIG. 2 is a flow diagram of an example process for determining the likelihood of a particular event occurring during a navigation interaction. For convenience, the process 200 will be described as being performed by a system of one or more computers located in one or more locations. For example, a likelihood system, e.g., the likelihood system 100 of FIG. 1, appropriately programmed in accordance with this specification, can perform the process 200.

The system can identify instances of a navigation interaction (202). For example, the system can identify instances of tailgating interactions (i.e., where one agent follows behind another agent closely on the road) by a follow distance between two agents, instances of looming by an object optically expanding in an agent's field of view, instances of unprotected turns at traffic lights (i.e., where one agent attempts to navigate a turning operation into or through oncoming traffic) by the state of the traffic light involved in the turn (e.g., green light or green arrow), or instances of one agent passing another traveling agent (e.g., one agent passing another while both are driving) by a relative displacement between two agents (e.g., a relative displacement turning from negative to positive. The system can identify situations where a rare adverse event has a probability larger than a predefined threshold to occur (e.g., the system can identify situations where a rare adverse event has a non-zero probability to occur, such as at least a 0.01% probability to occur), or the system can also identify instances where the particular event of interest actually occurred, such as collisions or near-collisions.

The system can generate multiple variations of each identified instance of the navigation interaction, as is described in further detail below. For convenience, each of steps (204)-(212) are described as being performed "for each navigation variation." That is, the system performs steps 204-212 for each navigation variation of each instance of the navigation interaction.

The system can identify one or more agents in the navigation variation (204). For example, the system can identify one or more agents by randomly selecting one or more agents from the set of agents in the navigation variation. In another example, the system can identify agents using a set of criteria based on the navigation interaction, e.g., based on the following distance between two agents for a tailgating interaction, based on the volume of traffic surrounding an agent attempting to make an unprotected turn, or based on a "stuck status" indicator (e.g., generated based on a measure of the elapsed time) for an agent waiting behind a stationary object or agent in a passing interaction.

For each identified agent, the system can obtain a probability distribution for each of one or more properties characterizing behavior of the agent (206). For example, the system can obtain a probability distribution characterizing the average follow distance of the agent behind another agent, the average acceleration of the agent, the average amount of wander within the respective lane of the agent, or a reaction time of the agent to a stimulus. Each obtained probability distribution can be generated, e.g., from agent data collected from sensors in real-world navigation interactions, or from machine learning models trained on real world data (i.e., from synthetic data). The agents from which the agent data is collected can be, e.g., autonomous vehicles, or agents controlled by humans. The agent data can be collected from many different agents of a particular agent type in many different real-world navigation interactions. For example, the probability distribution for a given agent property can be generated based on an empirical distribution of observed property values for the given property of agents observed navigating in the real-world. Sampling values for properties characterizing behavior of agents corresponding to agent data observed in real-world navigation interactions can enable the system to determine a likelihood based on more realistic simulations, increasing the reliability of the likelihood.

The system can sample a respective value for each property from the respective probability distribution (208). For example, the system can sample each value from the respective probability distribution based on a normal distribution with mean and variance generated to fit the agent data.

The system can provide the respective sampled values to a simulator (210). For example, the respective sampled values provided to the simulator can represent a variation of the navigation interaction where values sampled for properties characterizing behavior of an identified agent correspond to, e.g., follow distance, follow time, magnitude of acceleration, magnitude of braking, or reaction time to a stimulus.

The system can determine whether a particular event occurred during the simulated navigation variation (212) performed by the simulator. For example, the system can determine if a collision occurred between two agents in the simulated navigation variation, optionally, with what severity. The system can determine whether a high severity collision occurred, a low severity collision occurred, or no collision occurred (e.g., based on a metric which measures a high probability of an injury occurring, a low probability of an injury occurring, or no collision occurring, respectively).

The system can determine a likelihood that the particular event would occur during the navigation interaction (214) based on each of the navigation variations. For example, for each identified instance of the navigation interaction, the system can determine a rate that the particular event occurred over the respective variations of the identified instance of the navigation interaction. The system can determine a likelihood that the particular event would occur during the navigation interaction based on the determined rates of the particular event occurring, e.g., as an average of the determined rates or a weighted sum of the determined rates. For example, in a weighted sum of the determined rates, the weights can be determined to account for targeting a specific region of interest of the sampled probability distribution, such as long reaction times. The weight for a respective determined rate can be based upon a ratio between the likelihood that the sampled reaction time should have been sampled according to the distribution, and the likelihood that the system actually used to sample it. As an example, if the system oversampled long reaction times by drawing from them 75% of the time, but the likelihood to draw such a long reaction time was only 5%, the weight would be a ratio of the two likelihoods, i.e., (0.05/0.75), or (1/15).

Simulation can enable the determination of a likelihood for a particular event occurring during a real-world navigation interaction even if the particular event did not occur in the real-world. The system can generate multiple variations of a navigation interaction, where each variation represents how the navigation interaction could progress if the identified agents behaved corresponding to the sampled values of the properties corresponding to behavior of the agents. Simulation can be used to determine the likelihood of rare events, which can require the collection of large quantities of data to reliably determine the likelihood of the rare event occurring. Simulating the rare event multiple times can be much quicker than running a like number of real-world deployments, which can enable a much faster collection of the requisite data to support the likelihood determination.

Figure 3:
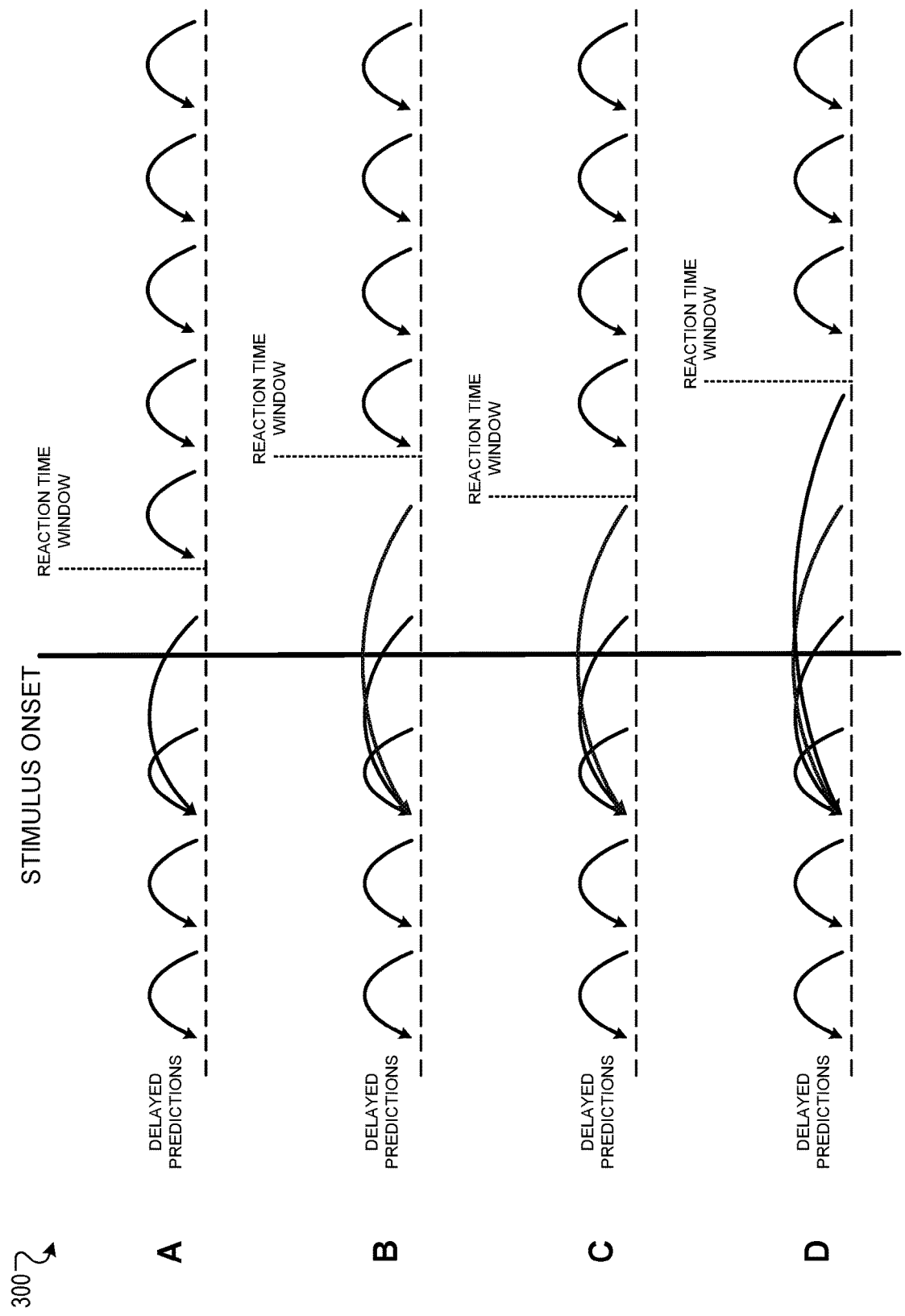
FIG. 3 is a diagram showing how predictions are delayed in example navigation variations involving sampled reaction times to the onset of a stimulus.

FIG. 3 is a diagram showing example navigation variations involving sampled reaction times to the onset of a stimulus. FIG. 3 describes an example navigation interaction in which (1) the navigation interaction includes a particular kind of stimulus, and (2) the property that is sampled is the reaction time of one of the identified agents to the stimulus.

FIG. 3 illustrates four variations of the specified navigation interaction, where for each variation a distinct reaction time was sampled for the identified agent.

The system can generate multiple variations of a navigation interaction involving an identified agent with a property characterizing a reaction time to the onset of a stimulus. For example, the system can generate each variation according to a value sampled from a probability distribution corresponding to reaction times in agent data. With reference to the example of FIG. 3, four variations of a navigation interaction involving a reaction time to the onset of a stimulus are shown, namely A, B, C, and D.

The system can generate each variation over a series of time steps. For example, each variation can be performed over a series of time steps with a predefined number of time steps, or each variation can be performed until specific criteria are met (e.g., a particular event occurring).

In the example of FIG. 3, the simulation selects actions to be performed by each identified agent at each time step based on behavior predictions of future behaviors of other agents generated from the point of view of the agent. For example, the simulation can generate the behavior predictions (e.g., respective states at each of multiple future time steps, such as positions and velocities relative to the agent) of each other agent based on observations of each other agent (e.g., the positions and velocities of each other agent) at each of multiple prior time steps and of states of the environment (e.g., states of objects in the environment, such as the position of a stop sign, or position and state of a traffic light) at each of multiple prior time steps. The simulation can select the respective action to be performed by a given identified agent (e.g., turning angle and acceleration of the agent) based on the respective behavior predictions for the other agents in the environment generated from the point of view of the agent and, in some cases, on an intended route of the identified agent.

Thus, for each navigation variation, the selected action for each identified agent at a time step is based on observations made on one or more previous time steps. With reference to the example of FIG. 3, the connections between the time step for which an action is selected and the time step from which come the observations processed to generate the selection are indicated using arrows, where the tail of an arrow points to the time step for which the action is selected, and where the head of the same arrow points to the time step from which came the observations used to generate the prediction.

For each navigation variation, a time step at which to initiate the stimulus can be determined. For example, the time can be determined based on a set of criteria characterizing the agents in the navigation interaction, e.g., the optical expansion of the lead vehicle in a tailgater's field of view. With reference to the example of FIG. 3, the time step of the stimulus onset for each variation is shown using a solid black line. For convenience, the stimulus onset in each navigation variation is shown as if it were occurring on the same time step.

For each navigation variation, a reaction time window is determined based on the sampled reaction time corresponding to the agent. For example, the reaction time window can be initiated simultaneously with the onset of the stimulus, and the duration of the reaction time window can be, e.g., equal to the sampled reaction time, or generated using a function taking the sampled reaction time as input. With respect to the example of FIG. 3, the reaction time window for each interaction variation is shown using a respective vertical dotted line, where the navigation variations in order of longest to shortest reaction time window duration are D>B>C>A.

For each navigation variation, the reaction time window can correspond to a time window during which all predictions of the identified agent are based on observations made during the most recent time step prior to the initiation of the stimulus. That is, the identified agent does not update the predictions about the future behavior of the other agents using any new information that is received after the most recent time step prior to the initiation of the stimulus and therefore does not take into account the stimulus occurring when predicting how other agents will act in the future. With respect to the example of FIG. 3, predictions made using the observations used on the most recent time step prior to the onset of the stimulus are shown by elongated arrows, where the tail of each subsequent arrow (corresponding to the time at which the respective prediction is made) progresses along the time line, while the head of the same arrow (corresponding to the time from which observations come) points to the time step prior to the onset of the stimulus.

For each navigation variation, once the reaction time window elapses, the observations on which the behavior predictions are based can be updated as normal. That is, once the reaction time window elapses, the agent can begin making behavior predictions that reflect the occurrence of stimulus. After the time window elapses, the simulation can update behavior predictions at the same rate as before the onset of the stimulus, or, in some cases, can update the behavior predictions more frequently, e.g., to simulate the identified agent being more attentive after detecting the stimulus than prior to detecting the stimulus. For example, with reference to the example of FIG. 3, the behavior predictions reflecting the occurrence of the stimulus are represented by resuming the same frequency of predictions.

Each navigation variation represents a "plausible" variation of the navigation interaction because of the probability distribution from which the reaction times are sampled. The different reaction times are sampled from probability distributions generated from agent data corresponding to many different agents of a particular agent type in many different real-world navigation interactions (e.g., from agents controlled by humans navigating traffic interactions). The sampled reaction times are processed to generate the reaction time windows. The different reaction time windows in each navigation variation can result in different actions being taken by the identified agent(s), and potentially by other agents in the navigation variation as a result. The resulting variation in the actions performed by each agent (e.g., turning angle, acceleration, etc.) and in the particular events that occur (e.g., collision, no collision) can be representative of a corresponding real-world navigation interaction, and can therefore be used to generate a likelihood that a particular event would occur during the corresponding real-world navigation interaction.

For example, if the navigation interaction involves a tailgating interaction between a lead agent and a following agent, a reaction time can be sampled (e.g., from a probability distribution generated from human-controlled agent data) for the following agent (e.g., representing a human-controlled agent). A reaction time window can be generated for the following agent in response to the onset of a stimulus representing the lead agent performing a "hard brake" (i.e., a brake of large magnitude causing a rapid deceleration). During the reaction time window, the following agent's behavior prediction of the lead agent is based upon observations of the lead agent made prior to the onset of the "hard brake" stimulus. Once the reaction time window elapses, the following agent can resume normal behavior predictions of the lead agent. Resulting events and actions can include, e.g., the following agent colliding with the lead agent before the reaction time window elapses, the following agent selecting actions (e.g., braking or swerving) in response to the stimulus to avoid colliding with the lead agent once the reaction time window elapses but still colliding with the lead agent, or the following agent selecting actions (e.g., braking or swerving) in response to the stimulus once the reaction time window elapses and successfully preventing a collision with the lead agent. The rate of occurrence of a collision across multiple variations of the tailgating interaction can be used to generate a likelihood that a collision would occur in a corresponding real-world tailgating interaction (e.g., an autonomous vehicle performing a hard brake while being followed by an agent controlled by a human).

Figure 4:
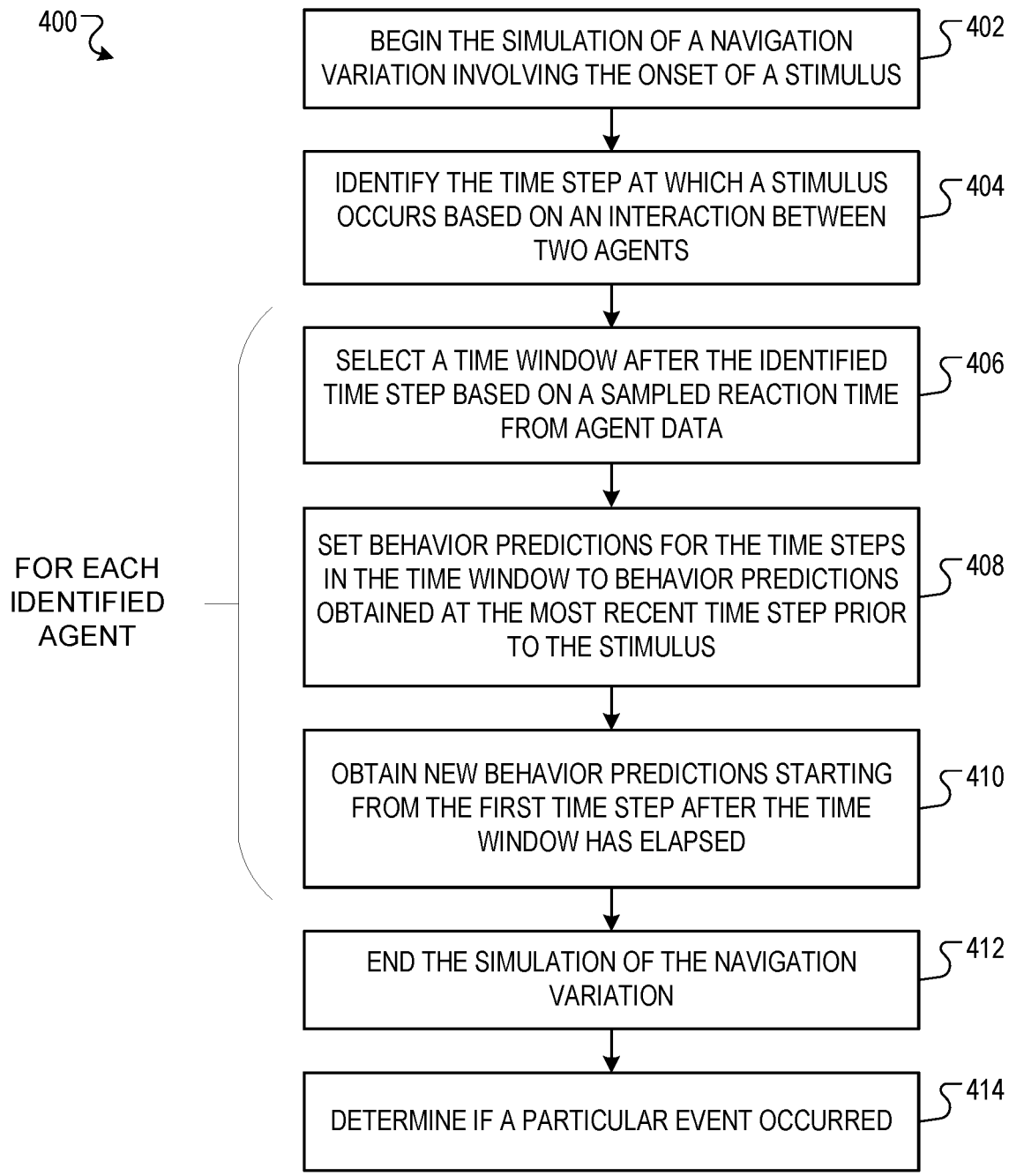
FIG. 4 is a flow diagram of an example process for simulating a navigation interaction involving the onset of a stimulus.

FIG. 4 is a flow diagram of an example process for simulating a navigation interaction involving the onset of a stimulus. For convenience, the process 400 will be described as being performed by a system of one or more computers located in one or more locations. For example, a likelihood system, e.g., the likelihood system 100 of FIG. 1, appropriately programmed in accordance with this specification, can perform the process 400.

The system can begin the simulation of a navigation variation (402) involving the onset of a stimulus. For example, the system can perform the simulation over a series of time steps, beginning from a first time step, e.g., of an autonomous vehicle involving a stimulus, e.g., an instance of hard braking while being followed by a second agent, or an instance of an object looming in the field of view of an agent.

The system can identify the time step at which a stimulus occurs based on an interaction between two agents (404). For example, the system can identify the time step at which an instance of hard braking (i.e., a lead agent hard brakes while being followed by a second agent) occurs, or the time step at which an instance of looming (i.e., an object comes within the field of view of an agent) occurs.

The system can perform steps (406)-(410) for each of one or more identified agents.

The system can select a time window after the identified time step which is based on a sampled value from a probability distribution corresponding to reaction times from agent data (406). For example, the data for reaction times can be from agents controlled by humans to represent a measure of human reaction times. Reaction times sampled from agents controlled by humans can be used to determine the likelihood of a particular event (e.g., a rear-end collision) occurring, e.g., when an autonomous vehicle interacts with a human-controlled agent.

The system can set behavior predictions for the time steps within the time window to behavior predictions obtained at the most recent time step prior to the stimulus (408). For example, the system can stop updates to the behavior predictions made during the time window, or the predictions made during the time window can be based on observations made at the most recent time step prior to the time window. The system can simulate, e.g., a distracted driver, when the reaction time that is sampled from the probability distribution corresponds to a longer reaction time window, e.g., to cover the time during which the distracted driver is no longer looking at the road.

The system can obtain new behavior predictions starting from the first time step after the time window has elapsed (410). For example, the system can begin updating the observations on which the agent generates behavior predictions. The system can simulate, e.g., a distracted driver resuming normal observation of the road by resuming new behavior predictions.

The system can end the simulation of the navigation variation (412). For example, the system can end the simulation after a set number of time steps, or a set number of time steps after the lapsing of the reaction time window.

The system can determine if a particular event occurred during the simulation of the navigation variation (414). For example, the system can determine if a collision occurred during the navigation variation, and optionally, if so, what level severity of collision occurred during the navigation variation. Simulating whether a particular event occurred during a variation of a navigation interaction can enable the system to determine the likelihood of the particular event, e.g., a collision or other safety-critical failure, occurring during the navigation interaction. The system can generate large numbers of variations of a safety critical application (e.g., autonomous vehicles operating in a real-world environment) in simulation, thereby avoiding placing vehicles in potentially unsafe situations in a real-world environment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   identifying an instance of a navigation interaction that includes an autonomous vehicle and one or more agents navigating in an environment;
   generating a plurality of simulated interactions corresponding to the instance, comprising, for each simulated interaction:
      identifying one or more of the agents;
      for each identified agent and for each of one or more properties that characterize behavior of the identified agent, obtaining data representing a probability distribution over a set of possible values for the property, wherein the one or more properties comprise a reaction time of the identified agent to a stimulus;
      sampling a respective value from each of the probability distributions; and
      simulating the navigation interaction using a computer simulation of the environment that, for each identified agent, selects actions performed by the identified agent at a plurality of time steps using behavior predictions for other agents in the computer simulation, and wherein the simulating comprises:
         selecting, based on the sampled value for the reaction time of the identified agent, a time window after a time step at which the stimulus occurred; and
         selecting actions performed by the identified agent for the time steps in the time window using prior behavior predictions from time steps prior to the stimulus occurring;
   determining, for each simulated interaction, whether a particular event occurred during the simulated interaction; and
   determining a likelihood that the particular event would occur during the navigation interaction based at least in part on whether the particular event occurred during each of the simulated interactions.

2. The method of claim 1, wherein simulating the navigation interaction comprises simulating the navigation interaction such that any other agent that is not identified behaves as the other agent did in the instance of the navigation interaction.

3. The method of claim 1, wherein, during the simulation, selecting actions performed by the identified agent for the time steps in the time window is in response to (i) state data characterizing a respective state of the environment at the time step and (ii) behavior predictions for other agents in the simulation.

4. The method of claim 3, wherein selecting actions performed by the identified agent for the time steps in the time window using prior behavior predictions from time steps prior to the stimulus occurring comprises:
   setting the behavior predictions for the time steps in the time window to the behavior predictions obtained at a most recent time step prior to the time step at which the stimulus occurred; and
   obtaining new behavior predictions starting from the first time step after the time window has elapsed.

5. The method of claim 1, wherein for each identified agent and for each of one or more properties that characterize behavior of the identified agent, obtaining data representing a probability distribution over a set of possible values for the property comprises:
   the probability distribution being generated from logged data characterizing agents navigating in the environment.

6. The method of claim 5, wherein for each identified agent and for each of the one or more properties, the probability distribution over the set of possible values for the property represents an estimate of a range of possible responses of agents controlled by humans to a stimulus.

7. The method of claim 1, wherein the particular event is a collision between two agents in the environment.

8. The method of claim 7, wherein the particular event is one of a low severity collision or a high severity collision.

9. The method of claim 1, further comprising:
   identifying, in the instance, a time point at which the stimulus occurs by identifying an interaction between two agents that satisfies one or more criteria.

10. A system comprising:
    one or more computers; and
    one or more storage devices storing instructions that, when executed by the one or more computers, cause the one or more computers to perform operations for determining the likelihood that a particular event would occur during a navigation interaction using one or more simulations of the navigation interaction, each simulation generated by sampling from agent data, the operations comprising:
    identifying an instance of a navigation interaction that includes an autonomous vehicle and one or more agents navigating in an environment;
    generating a plurality of simulated interactions corresponding to the instance, comprising, for each simulated interaction:
       identifying one or more of the agents;
       for each identified agent and for each of one or more properties that characterize behavior of the identified agent, obtaining data representing a probability distribution over a set of possible values for the property, wherein the one or more properties comprise a reaction time of the identified agent to a stimulus;
       sampling a respective value from each of the probability distributions; and
       simulating the navigation interaction using a computer simulation of the environment that, for each identified agent, selects actions performed by the identified agent at a plurality of time steps using behavior predictions for other agents in the computer simulation, and wherein the simulating comprises:
          selecting, based on the sampled value for the reaction time of the identified agent, a time window after a time step at which the stimulus occurred; and
          selecting actions performed by the identified agent for the time steps in the time window using prior behavior predictions from time steps prior to the stimulus occurring;
    determining, for each simulated interaction, whether a particular event occurred during the simulated interaction; and
    determining a likelihood that the particular event would occur during the navigation interaction based at least in part on whether the particular event occurred during each of the simulated interactions.

11. The system of claim 10, wherein simulating the navigation interaction comprises simulating the navigation interaction such that any other agent that is not identified behaves as the other agent did in the instance of the navigation interaction.

12. The method of claim 10, wherein, during the simulation, selecting actions performed by the identified agent for the time steps in the time window is for each identified agent, a respective action in response to (i) state data characterizing a respective state of the environment at the time step and (ii) behavior predictions for other agents in the simulation.

13. The method of claim 10, wherein selecting actions performed by the identified agent for the time steps in the time window using prior behavior predictions from time steps prior to the stimulus occurring comprises:
setting the behavior predictions for the time steps in the time window to the behavior predictions obtained at a most recent time step prior to the time step at which the stimulus occurred; and
obtaining new behavior predictions starting from the first time step after the time window has elapsed.

14. The system of claim 10, wherein for each identified agent and for each of one or more properties that characterize behavior of the identified agent, obtaining data representing a probability distribution over a set of possible values for the property comprises:
the probability distribution being generated from logged data characterizing agents navigating in the environment.

15. The system of claim 14, wherein for each identified agent and for each of the one or more properties, the probability distribution over the set of possible values for the property represents an estimate of a range of possible responses of agents controlled by humans to a stimulus.

16. The system of claim 10, wherein the particular event is a collision between two agents in the environment.

17. The system of claim 16, wherein the particular event is one of a low severity collision or a high severity collision.

18. One or more non-transitory computer storage media encoded with computer program instructions that when executed by one or more computers cause the one or more computers to perform operations for determining the likelihood that a particular event would occur during a navigation interaction using one or more simulations of the navigation interaction, each simulation generated by sampling from agent data, the operations comprising:
identifying an instance of a navigation interaction that includes an autonomous vehicle and one or more agents navigating in an environment;
generating a plurality of simulated interactions corresponding to the instance, comprising, for each simulated interaction:
identifying one or more of the agents;
for each identified agent and for each of one or more properties that characterize behavior of the identified agent, obtaining data representing a probability distribution over a set of possible values for the property, wherein the one or more properties comprise a reaction time of the identified agent to a stimulus;
sampling a respective value from each of the probability distributions; and
simulating the navigation interaction using a computer simulation of the environment that, for each identified agent, selects actions performed by the identified agent at a plurality of time steps using behavior predictions for other agents in the computer simulation, and wherein the simulating comprises:
selecting, based on the sampled value for the reaction time of the identified agent, a time window after a time step at which the stimulus occurred; and
selecting actions performed by the identified agent for the time steps in the time window using prior behavior predictions from time steps prior to the stimulus occurring;
determining, for each simulated interaction, whether a particular event occurred during the simulated interaction; and
determining a likelihood that the particular event would occur during the navigation interaction based at least in part on whether the particular event occurred during each of the simulated interactions.

19. The system of claim 10, further comprising:
identifying, in the instance, a time point at which the stimulus occurs by identifying an interaction between two agents that satisfies one or more criteria.

20. The non-transitory computer storage media of claim 18, wherein simulating the navigation interaction comprises simulating the navigation interaction such that any other agent that is not identified behaves as the other agent did in the instance of the navigation interaction.

* * * * *